US008046335B2

(12) United States Patent
Schwaab et al.

(10) Patent No.: US 8,046,335 B2
(45) Date of Patent: Oct. 25, 2011

(54) SYSTEM FOR AUTOMATICALLY SHADOWING DATA AND FILE DIRECTORY STRUCTURES THAT ARE RECORDED ON A COMPUTER MEMORY (75) Inventors: David Schwaab, Fort Collins, CO (US); Nathan Probst, Fort Collins, CO (US); Dennis B. Batchelor, Longmont, CO (US)

(73) Assignee: Rebit, Inc., Longmont, CO (US)

( * ) Notice: Subject to any disclaimer, the term of this patent is extended or adjusted under 35 U.S.C. 154(b) by 195 days.

(21) Appl. No.: 12/616,528

(22) Filed: Nov. 11, 2009

(65) Prior Publication Data
US 2010/0057794 A1    Mar. 4, 2010

Related U.S. Application Data (63) Continuation of application No. 11/933,240, filed on Oct. 31, 2007, now Pat. No. 7,640,280.

(60) Provisional application No. 60/863,665, filed on Oct. 31, 2006.

(51) Int. Cl.
G06F 17/30 (2006.01)
G06F 7/00 (2006.01)
(52) U.S. Cl. ...................................................... 707/651
(58) Field of Classification Search .................... 707/651
See application file for complete search history.

(56) References Cited

U.S. PATENT DOCUMENTS

| | | | | |
|---|---|---|---|---|
| 5,638,509 A | * | 6/1997 | Dunphy et al. | 714/20 |
| 5,852,724 A | * | 12/1998 | Glenn et al. | 709/239 |
| 5,864,853 A | * | 1/1999 | Kimura et al. | 707/10 |
| 5,905,888 A | | 5/1999 | Jones et al. | |
| 6,324,544 B1 | | 11/2001 | Alam et al. | |
| 6,571,285 B1 | | 5/2003 | Groath et al. | |
| 6,704,873 B1 | | 3/2004 | Underwood | |
| 7,240,060 B2 | * | 7/2007 | Adya et al. | 707/10 |
| 7,328,225 B1 | * | 2/2008 | Beloussov et al. | 707/203 |
| 2003/0120822 A1 | * | 6/2003 | Langrind et al. | 709/251 |
| 2003/0182325 A1 | | 9/2003 | Manley et al. | |
| 2004/0243794 A1 | | 12/2004 | Mackin et al. | |
| 2005/0010918 A1 | | 1/2005 | Childs et al. | |
| 2005/0027845 A1 | | 2/2005 | Secor et al. | |
| 2005/0033718 A1 | | 2/2005 | Rettig et al. | |

(Continued)

OTHER PUBLICATIONS

In the U.S. Appl. No. 11/933,240, Non-Final Office Action dated Dec. 18, 2008, 15 pages; and response dated Mar. 18, 2009, 13 pages.

(Continued)

Primary Examiner — Kuen Lu
(74) Attorney, Agent, or Firm — Patton Boggs LLP (57) ABSTRACT The Data Shadowing System comprises a memory module that is connected to the monitored computer system via an existing input/output port to store the shadowed data. The memory module includes a memory device for data storage as well as software, including a control software component that is automatically installed on the monitored computer system when the memory module is first connected to the monitored computer system, as well as associated module software for maintaining a record of the data stored on the memory device. The Data Shadowing System automatically stores the data on the memory module in a single format, while representing it in a data management database in two formats: disk sectors and files. The Data Shadowing System thereby efficiently tracks and stores the state of multiple file systems over time, while allowing for correct disk-level and file-level restoration to a point-in-time without storing redundant data.

24 Claims, 8 Drawing Sheets

U.S. PATENT DOCUMENTS

| | | |
|---|---|---|
| 2005/0086241 A1 | 4/2005 | Ram et al. |
| 2005/0216788 A1 | 9/2005 | Mani-Meitav et al. |
| 2005/0283662 A1 | 12/2005 | Li et al. |
| 2006/0095659 A1 | 5/2006 | New et al. |
| 2007/0136200 A1 | 6/2007 | Frank et al. |
| 2008/0104147 A1 | 5/2008 | Schwaab et al. |

OTHER PUBLICATIONS

In the U.S. Appl. No. 11/933,240, Final Office Action dated May 1, 2009, 18 pages; and response dated Jul. 27, 2009, 19 pages, including Request for Continued Examination.

In the U.S. Appl. No. 12/173,585, Non-Final Office Action dated Sep. 28, 2009, 12 pages.

International Search Report in co-pending PCT Application No. PCT/US2007/083224 dated May 15, 2008.

International Search Report in co-pending PCT Application No. PCT/US2008/082055 dated Jan. 23, 2009.

International Search Report in co-pending PCT Application No. PCT/US2009/050759 dated Sep. 15, 2009.

Young et al.; "The duality of memory and communication in the implementation of a multiprocessor operating system"; in Proceedings of the 11th ACM Symposium on Operating Systems Principles; Austin, Texas; pp. 63-76; published Nov. 1987.

\* cited by examiner

SYSTEM FOR AUTOMATICALLY SHADOWING DATA AND FILE DIRECTORY STRUCTURES THAT ARE RECORDED ON A COMPUTER MEMORY

CROSS-REFERENCE TO RELATED APPLICATIONS

This application is a Continuation of U.S. patent application Ser. No. 11/933,240 titled "System For Automatically Shadowing Data And File Directory Structures That Are Recorded On A Computer Memory" and filed on Oct. 31, 2007, which claims priority to U.S. Provisional Application No. 60/863,665, titled "Data Backup Systems And Methods" and filed on 31 Oct. 2006. This application is also related to U.S. patent application Ser. No. 11/933,261 titled "System For Automatically Recovering A Computer Memory Using Shadowed Data And File Directory Structures" and filed on Oct. 31, 2007; U.S. patent application Ser. No. 11/933,197 titled "System For Automatically Shadowing Data And File Directory Structures For A Plurality Of Network Connected Computers Using A Network Attached Memory With Single Instance Storage" and filed on Oct. 31, 2007; and U.S. patent application Ser. No. 11/933,155 titled "System For Automatically Shadowing Encrypted Data And File Directory Structures For A Plurality Of Network Connected Computers Using A Network Attached Memory With Single Instance Storage" and filed on Oct. 31, 2007. All of the foregoing non-provisional and provisional applications are hereby incorporated by reference to the same extent as though fully disclosed herein.

FIELD OF THE INVENTION

This invention relates to systems that are used to provide data backup for individual computer systems.

BACKGROUND OF THE INVENTION

It is a problem both to safeguard data that is stored on a computer system and to restore all or portions of this data that are lost or corrupted. Many computer systems have no protection systems in place, and the loss of data from these computer systems is irrevocable. Other computer systems make use of attached data backup systems to store a copy of the data that is stored in the computer memory and updates thereto for eventual retrieval to restore data that is lost from or corrupted in the computer system memory. However, the use of these existing data backup systems is laborious and can be confusing to the casual user.

In information technology, backup refers to making copies of data so that these additional copies may be used to restore the original after a data loss event. These additional copies are typically called "backups." Backups are useful primarily for two purposes. The first is to restore a computer to an operational state following a disaster (called "disaster recovery"). The second is to restore one or more files after they have been accidentally deleted or corrupted. Backups are typically that last line of defense against data loss and, consequently, the least granular and the least convenient to use.

Since a data backup system contains at least one copy of all data worth saving, the data storage requirements are considerable, which data storage requirements can be exacerbated by the method used to perform the data backup where change tracking is wasteful of memory. Organizing this storage space and managing the backup process is a complicated undertaking. A data repository model can be used to provide structure to the data storage device for the management of the data that is backed up. In the modern era of computing, there are many different types of data storage devices that are useful for making backups. There are also many different ways in which these data backup devices can be arranged to provide geographic redundancy, data security, and portability.

Before data is ever sent to its data backup storage location, it is selected, extracted, and manipulated. Many different techniques have been developed to optimize the backup procedure. These include optimizations for dealing with open files and live data sources as well as compression, encryption, and de-duplication, among others. Many organizations and individuals require that they have some confidence that the backup process is working as expected and work to define measurements and validation techniques to confirm the integrity of the backup process. It is also important to recognize the limitations and human factors involved in any backup scheme.

Due to a considerable overlap in technology, backups and data backup systems frequently are confused with archives and fault-tolerant systems. Backups differ from archives in the sense that archives are the primary copy of data and backups are a secondary copy of data. Data backup systems differ from fault-tolerant systems in the sense that data backup systems assume that a fault will cause a data loss event, and fault-tolerant systems assume a fault will not cause a data loss event.

Data Repository Models

Any backup strategy starts with the concept of a data repository. The backup data needs to be stored somehow and probably should be organized to a degree. It can be as simple as a manual process which uses a sheet of paper with a list of all backup tapes and the dates they were written or a more sophisticated automated setup with a computerized index, catalog, or relational database. Different repository models have different advantages. This is closely related to choosing a backup rotation scheme. The following paragraphs summarize the various existing backup models presently in use.

Unstructured

An unstructured repository may simply be a writeable media consisting of, for example, a stack of floppy disks or CD-R media with minimal information about what data from the computer system was backed up onto this writeable media and when the backup (s) occurred. This is the easiest backup method to implement but probably the least likely to achieve a high level of recoverability due to the dearth of indexing information that is associated with the data that is backed up.

Full + Incremental

A Full + Incremental data backup model aims to make storing several copies of the source data more feasible. At first, a full backup of all files from the computer system is taken. After that full backup is completed, an incremental backup of only the files that have changed since the previous full or incremental backup is taken. Restoring the whole computer system to a certain point in time requires locating not only the full backup taken previous to that certain point in time but also all the incremental backups taken between that full backup and the particular point in time to which the system is supposed to be restored. The full backup version of the data then is processed, using the set of incremental changes, to create a present view of the data as of that designated certain point in time. This data backup model offers a high level of security that selected data can be restored to its present state, and this data backup model can be used with removable media such as tapes and optical disks. The downside of this data backup process is dealing with a long series of incremental changes and the high storage requirements entailed in this data backup process, since a copy of every changed file in each incremental backup is stored in memory.

Full + Differential

A Full + Differential data backup model differs from a Full + Incremental data backup model in that, after the full backup is taken of all files on the computer system, each incremental backup of the files captures all files created or changed since the full backup, even though some may have been included in a previous partial backup. The advantage of this data backup model is that restoring the whole computer system to a certain point in time involves recovering only the last full backup and then overlaying it with the last differential backup.

Mirror + Reverse Incremental

A Mirror + Reverse Incremental data backup model is similar to a Full + Incremental data backup model. The difference is that, instead of an aging full data backup followed by a series of incremental data backups, this model offers a mirror that reflects the state of the computer system as of the last data backup and a history of reverse incremental data backups. One benefit of this data backup method is that it only requires an initial full data backup. Each incremental data backup is immediately applied to the mirror and the files they replace are moved to a reverse incremental backup. This data backup model is not suited to the use of removable media, since every data backup must be done in comparison to the data backup mirror version of the data. This process, when used to restore the whole computer system to a certain point in time, is also intensive in its use of memory.

Continuous Data Protection

This data backup model takes the data backup process a step further and, instead of scheduling periodic data backups, the data backup system immediately logs every change made on the computer system. This generally is done by saving byte or block-level differences rather than file-level differences. It differs from simple disk mirroring in that it enables a rollback of the log and, thus, can restore an old image of data. Restoring the whole computer system to a certain point in time using this method requires that the original version of the data must be processed to incorporate every change recorded in each differential change to recreate the present version of the data.

Problems

In spite of all of these various methods of data backup, existing data backup systems (including both hardware and software) fail to ensure that the user can simply plug in to the computer system to "back-up" the data stored therein, and also enable recovery of a revision of a file from a point-in-time, and enable all of the hard disk(s) in the computer system to be restored to a point-in-time. Existing data backup systems fail to efficiently track and store the state of multiple file systems over time, while allowing for correct disk-level and file-level restoration, to a point-in-time, without storing a significant amount of redundant data. These data backup systems require the user to learn new technology, understand the file system of the computer system, learn how to schedule data backup sessions, and learn new controls that must be used for this new functionality. Furthermore, the restoration of lost files is difficult using these data backup systems.

BRIEF SUMMARY OF THE INVENTION

The above-described problems are solved and a technical advance achieved by the present System For Automatically Shadowing Data And File Directory Structures That Are Recorded On A Computer Memory (termed "Data Shadowing System" herein) which comprises a memory module that is connected to the monitored computer system via an existing communication medium, such as an input/output port to store the shadowed data. The memory module includes a memory device for data storage as well as software, including a control software component that is automatically installed on the monitored computer system when the memory module is first connected to the monitored computer system, as well as associated module software for maintaining a record of the data stored on the memory device and controlling the operation of the memory device.

The Data Shadowing System automatically stores the data which is retrieved from the memory of the monitored computer system onto the memory device located in the memory module in a single format, while representing it in a data management database in two formats: disk sectors and files. The Data Shadowing System thereby efficiently tracks and stores the state of multiple file systems over time, while allowing for correct disk-level and file-level restoration, to a point-in-time, without storing redundant data.

The Data Shadowing System operates autonomously, freeing the user from needing to interact with the Data Shadowing System to have the memory of the monitored computer system backed up. The backup is nearly always up to date so long as the Data Shadowing System is connected to the monitored computer system. The Data Shadowing System incorporates database technology to optimize the data storage and retrieval for normal operations, and the database of file directory information itself resides on the monitored computer system hard drive, while a backup copy of the database is written periodically to the Data Shadowing System.

In addition, the file changes, creations, relocations, and deletions are tracked through time, with the Data Shadowing System enabling point-in-time restoration of individual files as well as file systems. The full system restore capability enables the reconstruction of the entire memory of the monitored computer system, including: operating system, applications, and data files for a given point in time without requiring the intervention of the user.

If the Data Shadowing System memory module is disconnected from the monitored computer system for any length of time, the control software component that executes on the monitored computer system tracks the appropriate file changes occurring through time and then performs normal backup activities once the Data Shadowing System memory module is reconnected to the monitored computer system.

DETAILED DESCRIPTION OF THE INVENTION

Definitions

The following terms as used herein have the following meanings.

"File system"—the system utilized by the computer operating system to organize, store, and access information contained in the computer system memory.

"File navigation system"—the textual, hierarchical navigation interface used by the computer operating system to provide a user with an organized manner of storing, identifying, locating, and operating on files for user operations contained in the computer system memory.

"Change journal"—a computer operating system provided system to identify and track any file changes, creations, deletions, or relocations.

"Meta file"—an indirect means of storing information about a related file (e.g., file size and creation date for a data file).

"Page file"—a computer operating system defined and created file which is specific to the present session running on the computer system; the page file represents short-lived data that is not valid or meaningful to a subsequent session and, therefore, is of no value to retain.

"Integrity Point"—a collection of files and file references which exist at a particular time to represent the files that were current and valid for that time; restoration of an integrity point ensures that files are consistent and meaningful to the computer operating system and applications that may require multiple files to be self-consistent.

"File Reference Number" or FRN—a unique identifier for a given file or folder entry in the file system file table.

"NTFS"—Acronym associated with the file system for a computer operating system. The file system provides an important feature known as journaling, which creates a queue of file changes, creations, deletions, or relocations.

System Architecture

Figure 1A:
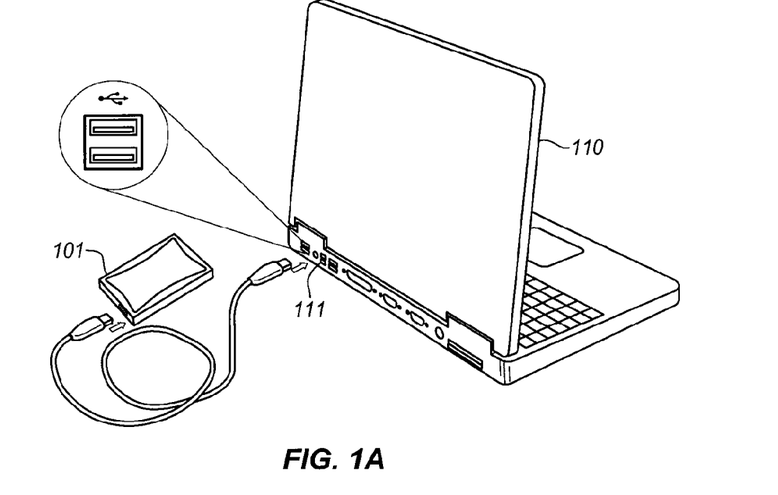
FIG. 1A illustrates a perspective view of a typical computer system that is connected to the present Data Shadowing System.
Figure 1B:
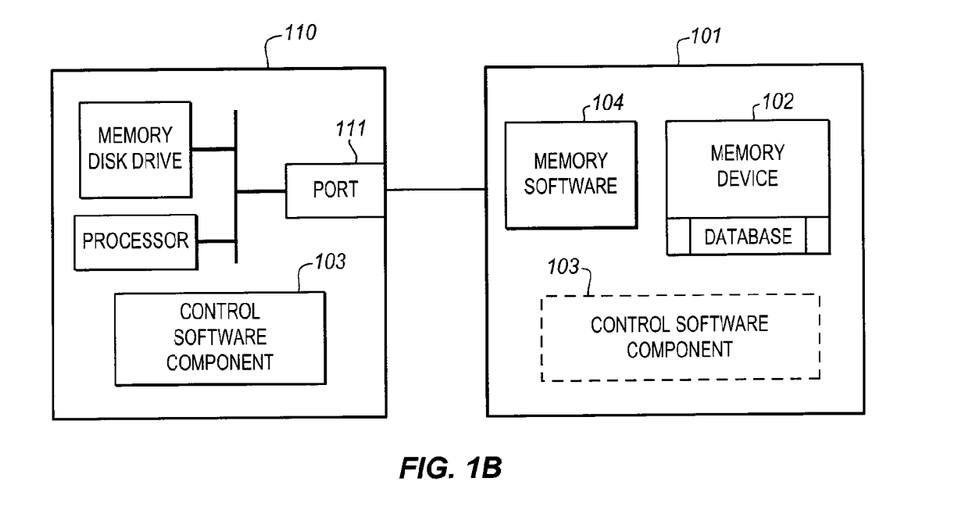
FIG. 1B illustrates the basic architecture of the present Data Shadowing System.

FIG. 1A illustrates a perspective view of a typical computer system that is equipped with the present Data Shadowing System, and FIG. 1B illustrates the basic architecture of the present Data Shadowing System 100. The monitored computer system 110 typically includes a processor 112, memory 113 (such as a disk drive, although any form of read/write memory can be used, and the term "memory" is used herein to describe this element), and a data communication medium 115, such as an input/output port 111, or wireless interface and the like. The Data Shadowing System 100 comprises a memory module 101 that is connected to the computer system 110 via an existing data communication medium 115, such as input/output port 111 and its associated cable to store the shadowed data. For the sake of example, the data communication medium illustrated herein is the existing standard USB port 111, which provides both a data communication path as well as a source of power for the memory module 101. However, any data communication medium can be used, whether wired or wireless and whether capable of supplying power to the memory module 101 or not. The memory module 101 includes a memory device 102 and its associated memory module software 104 and database 105 for managing the data storage, as well as a control software component 103 that is automatically installed on the monitored computer system 110 when the memory module 101 is first connected to the monitored computer system 110.

The simplicity and ease of use of the Data Shadowing System 100 requires minimal user interaction, and the "Autorun" feature of the USB connection 111 can be used, for example, to support an automatic installation of the Data Shadowing System software component 103. Thus, upon the first connection of the memory module 101 of the Data Shadowing System 100 to the monitored computer system 110, the Data Shadowing System 100 calls the "Autorun" software resident on the operating system of the monitored computer system 110 to initiate the installation application portion of the control software component 103 which is stored on the memory module 101 of the Data Shadowing System 100. (Alternatively, a mountable media can be used to initiate installation of the control software component 103 from the monitored computer system 110.) The installation application then identifies that this is an initial installation of the Data Shadowing System 100 with the monitored computer system 110. The memory module software 104 requests system information from the operating system of the monitored computer system 110 and stores this system information in a database 105. This system information subsequently is used to determine if the Data Shadowing System 100 has been previously connected to monitored computer system 110. If the Data Shadowing System 100 has already been installed, the monitored computer system 110 activates memory module 101 and starts talking to it. Power for the memory module 101 can be obtained from the data communication medium, or an internal or external power source can be used, as a function of the installation of the memory module 101 and the data communication medium 115 used.

Initialization

Figure 2A:
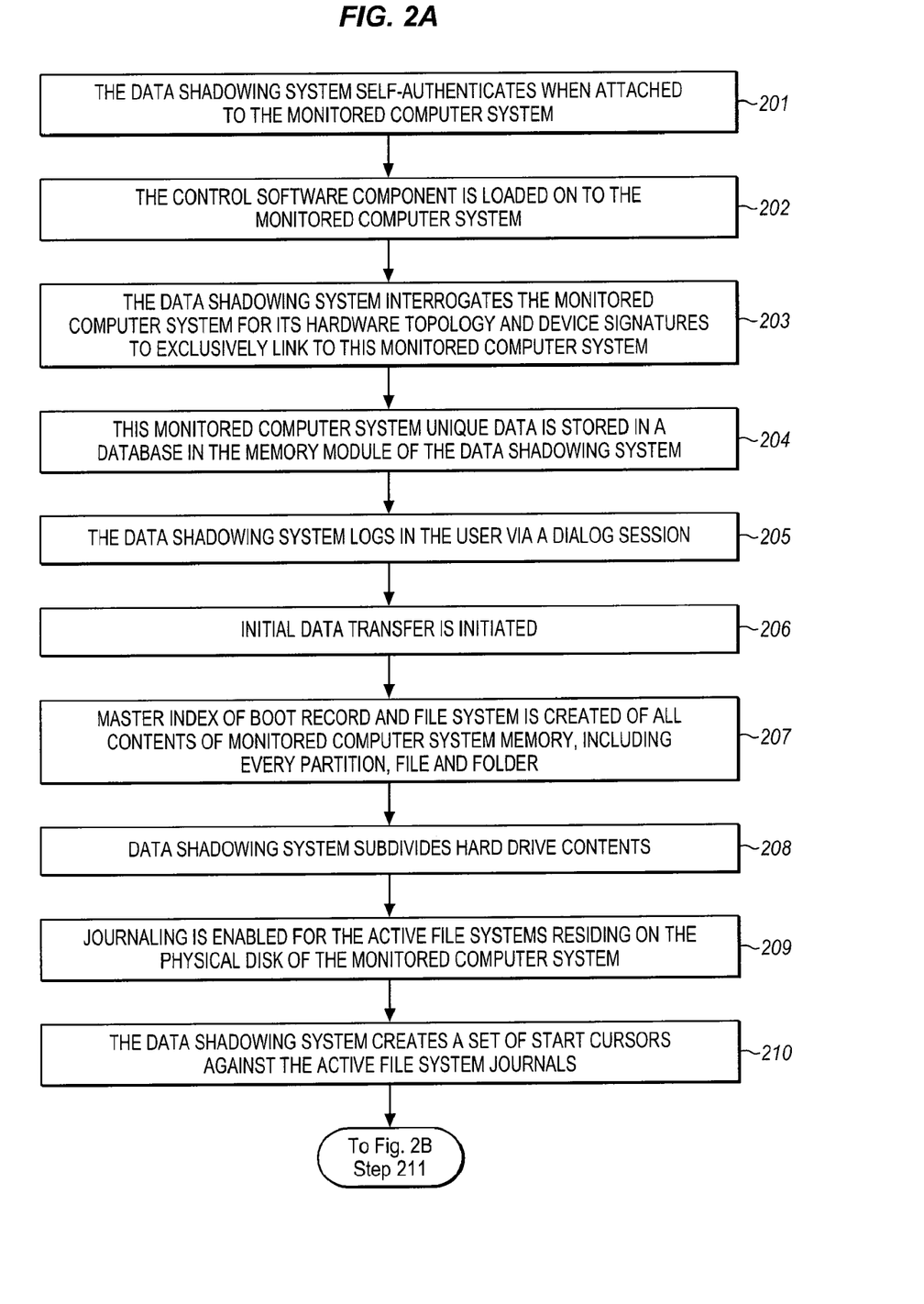
FIGS. 2A and 2B illustrate, in flow diagram form, the operation of the present Data Shadowing System during the initial installation of the Data Shadowing System on a monitored computer system.
Figure 2B:
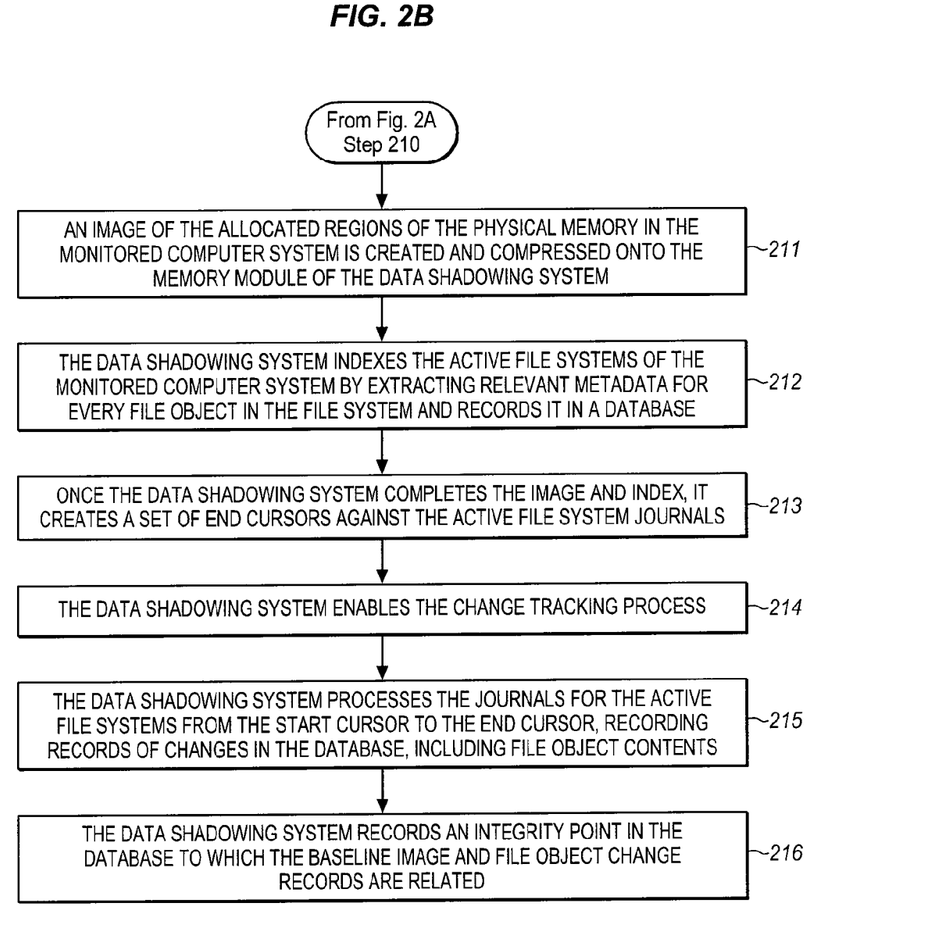

FIGS. 2A and 2B illustrate, in flow diagram form, the operation of the present Data Shadowing System 100 during the initial installation of the Data Shadowing System 100 on a monitored computer system 110, where the Data Shadowing System 100 is linked exclusively to this monitored computer system 110 and an initial shadow copy of the contents of the monitored computer system's memory is created in the memory module 101 of the Data Shadowing System 100.

The Data Shadowing System 100 in this example is powered by the monitored computer system 110 via the data communication medium 115 as noted above, and optionally self-authenticates at step 201 when it is first attached to the monitored computer system 110 by ensuring that the serial number encoded into the memory device 102 of the Data Shadowing System memory module 101 matches the serial number entry inserted into the control software component 103. During manufacturing, the serial number is queried from the memory device 102, inserted into the control software component 103, and stored onto the Data Shadowing System 100 in a manner to circumvent unauthorized replication of the Data Shadowing System 100 software onto additional memory devices.

The Data Shadowing System 100 then begins installation and initialization of the Data Shadowing System 100 for the monitored computer system 110 at step 202. In place of the traditional software installation process whereby the user is required to insert a mountable media into a selected drive of the monitored computer system 110 in order to install software, the Data Shadowing System 100 can utilize the simple "Autorun" feature of the USB standard of port 111. The control software component 103 of the Data Shadowing System 100 is loaded onto the monitored computer system 110 at step 202; and at step 203, the monitored computer system 110 is interrogated by the control software component 103 of the Data Shadowing System 100 to obtain data which defines the hardware topology and device signatures of the monitored computer system 110. This signature information is used to "pair" the Data Shadowing System 100 to the monitored computer system 110 and is stored in memory module software 104 at step 204.

The Data Shadowing System 100 displays a simple dialog box to the user at step 205 via the display screen of the monitored computer system 110 to indicate that they agree to the Data Shadowing System 100 user license agreement. This simplified user agreement dialog is required to ensure that the user is agreeable with the terms set forth in the end user license agreement. If the user did not intend to install the Data Shadowing System 100, or is dissatisfied with the end user license agreement, nothing remains on the monitored computer system 110 pertaining to the Data Shadowing System 100.

Upon successful installation of the Data Shadowing System 100, the user is not required to take further action to ensure the protection and backup of the data that is presently stored and subsequently added, deleted, or modified on the memory 113 of the monitored computer system 110. The user is required to leave the memory module 101 of the Data Shadowing System 100 attached to the monitored computer system 110 for an initial period of time in order to have an initial valid backup of their data files and directory structures from the monitored computer system 110 to the memory module 101 of the Data Shadowing System 100 at step 206, but attaching the memory module 101 of the Data Shadowing System 100 is the only action step required of the user. The control software component 103 concurrently monitors the ongoing memory activity of the monitored computer system 110 while the initial data backup is being executed without requiring the modification of the monitored computer system 110 or the use of complex interconnection processes.

The Data Shadowing System 100 efficiently stores the data retrieved from the memory 113 of the monitored computer system 110 in a single format, while representing it internally in two formats: disk sectors and files. The Data Shadowing System 100 also efficiently tracks and stores the state of multiple file systems that are resident on the monitored computer system 110 over time, while allowing for correct disk-level and file-level restoration, to a point-in-time, without storing redundant data. A Meta File System may be implemented in the Data Shadowing System 100 to describe the state of each active file system and the underlying physical disk or disks, at a point-in-time, with integrity. The Meta File System is an internally consistent, related-in-time, collection of critical data and metadata from the file systems and physical disks under its protection. The Meta File System may collect certain data, and do so in a way that correctness is ensured.

Typical Meta-File data that is collected may include:
A baseline image of the non-NTFS sectors which are formatted on each physical disk installed in the monitored computer system 110.
A complete indexing of the file systems contained on each physical disk for a designated point-in-time. This index includes the mapping of file objects to their location on the physical disk.
A serialized journal of file system changes over time.
Copies of the file object contents resulting from file system changes over time.
Multiple self-consistent "snapshots" of the on-disk metadata for each active file system at a point-in-time.

The challenge of creating a consistent-in-time view of multiple active file systems is met by combining the collected data into a single database and organizing and accessing it via data management algorithms resident in the Data Shadowing System 100.

Memory Indexing

The first step in this initial data transfer process is to generate a master index of all contents of the monitored computer system's memory 113 at step 206. The control software component 103 discovers each storage device (memory 113) on the monitored computer system 110 and creates a corresponding Object Model for each Storage Device (TRStorageDevice). The Storage Device objects are children of the monitored computer system 110. While they all share some base level attributes, they can specialize for different aspects of the physical device.

For each TRStorageDevice, monitored computer system 110 identifies all of the unique disk regions that it contains and creates an object model for each (TRDiskRegion). While all TRDiskRegions share some basic traits, they specialize themselves according to the type of Region they describe. For instance, examples of unique disk regions include the Master Boot Record (MBR), the partition table, a file system region (NTFS or FAT32 partition), a hidden OEM recovery partition, and seemingly unused "slices" that are the leftovers between formal partitions. Data Shadowing System 100 identifies and accounts for every single sector on a physical storage device and creates an appropriate TRDiskRegion object to manage and index them.

TRDiskRegions that do not have a recognizable file system are treated as "Block Regions." Block Regions comprise a span of disk sectors (start, from sector zero, and length), and are simply archived as a block range onto the Data Shadowing System 100 memory device 102.

This master index includes processing the master boot record and file system at step 207 to generate an index of every partition, file, and folder on the monitored computer system 110; and this index data for each partition, file, and folder is entered into a database 114 residing on the monitored computer system memory 113 as well as optionally a database 105 in the memory module 101.

The master boot record contains information about the arrangement of data on the monitored computer system memory 113. These contents may be arranged with subsets of data such that there is a primary bootable partition and alternate, non-bootable partitions. An entry in the master boot record determines the status of these partitions, as well as size and binary offset values for each partition. Capturing and processing this information permits the Data Shadowing System 100 to automatically reconstruct the entire contents of the monitored computer system memory 113. The database exists largely to facilitate a (faster) way to search and retrieve file history and revisioning. The method used to lay down the "copy/backup" of the file system of the monitored computer system 110 enables recreation of the data contained in the database 114 from the Data Shadowing System 100 itself. In the case of Data Shadowing System 100, most of the Object Models that model a feature or attribute of the monitored computer system 110 are persisted to the Data Shadowing System 100 memory module 101 as file system streams in a directory structure that matches or emulates the physical hierarchy from where they came from.

After processing the master boot record, the file system for the primary bootable partition is processed at step 208 to record each file and folder entry, placing records into the database 114 residing on the monitored computer system memory 113. This database contains information about each file and folder and is accessed primarily during file retrieval requests and is also updated with changes to individual files and folders to create a chronological record of changes. This same database 114 is mirrored (database 105) onto the Data Shadowing System memory module 101 whenever the memory module 101 is connected to the monitored computer system 110. The mirrored database 105 is used primarily during full-system restoration where the monitored computer system memory 113 may have failed and the mirrored database 105 contains records of each file and folder residing in the binary data copied to the Data Shadowing System memory device 102. TRDiskRegions that do have a recognized file system create an Object Model for the file system "Volume" (TRVolume). A Volume understands the concepts and navigation of its contained file system and the concept of its associated mount point.

Memory Copy

Upon completion of processing the master boot record and file system, the Data Shadowing System 100 begins the second step of this process by copying the binary information from the monitored computer system memory 113 with the exception of a subset of the memory 113. The exception subset consists of: areas not allocated, or identified as in use, by any of the partitions, as well as areas identified as temporary information by the operating system. An example of the temporary information is the operating system page file, which is useful only during the current session and is meaningless to a subsequent session.

The copy process identifies a Data Shadowing System 100 storage device and writes the non-NTFS file objects onto the Data Shadowing System 100 memory device 102 at step 211. Once all of these objects are written into memory device 102, the Data Shadowing System 100 writes all of the NTFS files onto memory device 102 at step 212 in a directory hierarchy that mimics their physical and logical relationships on the monitored computer system 110. Below is a simple base directory tree of a Data Shadowing System 100 (depth of the contained file systems has been omitted:

R:\data\REBITDV05\072CE3A9
R:\data\REBITDV05\19F418B5
R:\data\REBITDV05\647931C9
R:\data\REBITDV05\647931D6
R:\data\REBITDV05\072CE3A9\Region0
R:\data\REBITDV05\072CE3A9\Region1
R:\data\REBITDV05\072CE3A9\Region2
R:\data\REBITDV05\072CE3A9\Region1\{ddffc3ed-7035-11dc-9485-000c29fddfb0}
R:\data\REBITDV05\072CE3A9\Region2\{ddffc3f3-7035-11dc-9485-000c29fddfb0}
R:\data\REBITDV05\19F418B5\Region0
R:\data\REBITDV05\19F418B5\Region1
R:\data\REBITDV05\19F418B5\Region1\{732534f9-cb5a-11db-befe-806e6f6e6963}
R:\data\REBITDV05\647931C9\Region0
R:\data\REBITDV05\647931C9\Region1
R:\data\REBITDV05\647931C9\Region1\{a93586cc-cb5f-11db-b097-000c29e897d0}
R:\data\REBITDV05\647931D6\Region0
R:\data\REBITDV05\647931D6\Region1
R:\data\REBITDV05\647931D6\Region2
R:\data\REBITDV05\647931D6\Region1\{a93586d2-cb5f-11db-b097-000c29e897d0}

To understand this, the control software component 103 knows that the Networked Data Shadowing System storage device 103 was mounted on drive "R:" and all archiving operations are going to directory "data" which is located in the memory module 101. The next indicia in this string is the name of the monitored computer system 110 that provided the content "REBITDEV05", then the physical disk signature (i.e., 072CE3A9, 072CE3A9, etc.). If the disk drive has data that is to be archived, it is then organized into Region objects that are simply sequentially numbered (Region0, Region1, etc.). If a region contains an understood file system/volume, its volume identifier is used in the persistent storage to map its path. In the case of R:\data\REBITDV05\072CE3A9\Region1\{ddffc3ed-7035-11dc-9485-000c29 fddf b0}, on this system, it happens that this is an NTFS volume, and a full mirror of the file system for drive "C:" of the monitored computer system 110.

A key point here is that the Object Models for each element of the monitored computer system 110 are themselves stored in file system streams on the Data Shadowing System 100 memory device 102. For example, the TRMachine object is "saved" as a hidden stream inside of the R:\data\REBITDEV05\ directory entry, and the volume object for R:\data\REBITDV05\ 072CE3A9\ Region1\ {ddffc3ed-7035-11dc-9485-000c29fddfb0} is saved as a hidden stream on that directory entry.

What this means is, from the Data Shadowing System 100 file system alone, all of the object relationships and their metadata can be reconstructed with no database. Further, when a file eventually is archived to the Data Shadowing System 100, all of its associated history and metadata are stored as hidden streams in the file entry itself. The database 114 can be completely reconstructed from the Data Shadowing System 100 storage file system itself.

In addition, in the Data Shadowing System 100 storage architecture, the files are not actually stored with the name they had on the monitored computer system 110. Rather, they are stored with a file name that is a unique hash value of the contents of that file. A file system "soft link" then is used in the directory structure above to point to the data of the hash value named "blob" of data that is the file from the monitored computer system 110. The user only sees the soft link. Data Shadowing System 100 stores the hashed value named file. If any two files hash to the same value (meaning they are binary identical), only one copy need be hosted in storage, and the symbolic links for both host copies point to the same stored content. This attribute of functionality is the first level of intrinsic data de-duplication.

To continue, when a file is modified on the monitored computer system 110, the new data is hashed, named, and stored on the monitored computer system 110; and the old version of the file is removed and replaced with only a description of its binary differences to the new version (Reverse X-Delta). This strategy allows for Data Shadowing System 100 to keep pristine copies of all current files, while being able to regenerate previous versions at all times and minimizing data storage space requirements on the Data Shadowing System 100 itself.

Because of the time required to read the memory 113 of the monitored computer system 110, and because it contains an active file system, the Data Shadowing System 100 enables Journaling at step 209 for the active file systems residing on the physical disk being imaged. In addition, the Data Shadowing System 100 at step 210 sets the flag in the database indicating an Integrity Point is desired by creating a set of cursors against the active file system journals, which set of cursors are termed the "Start Cursors". The Journal process begins identifying and queuing files to act upon. Once the cursors are created, the Data Shadowing System 100 at step 211 creates and compresses an image of the active file systems into the memory device 101 of the memory module 101 of the Data Shadowing System 100. To save memory space, the active file systems are queried for their allocated regions of the physical disk, and only allocated regions are read and compressed.

At step 212, the Data Shadowing System 100 indexes the active file systems to extract relevant metadata for every file object in the file system and records it in a database. The Data Shadowing System 100 identifies and indexes all directories contained within the file navigation system by File Reference Number, or FRN, and identifies and inserts entries into the database for each cluster run representing the file. The Data Shadowing System 100 initializes the baseline by inserting entries in the database signifying completion of the initialization. Once the image and index are complete, the Data Shadowing System 100 at step 213 creates a second set of cursors against the active file system journals, termed the "Most Recent Entries".

At step 214, the Data Shadowing System 100 enables Change Tracking; and at step 215, the journals for the active file systems are processed from the Start Cursor to the Most Recent Entry, to record records of changes in the database, including file object contents. Upon reaching a point-in-time where no files remain in the queue to process, the appropriate actions are taken to insert an Integrity Point entry into the database.

Finally, at step 216, the Data Shadowing System 100 records an Integrity Point in the database to which the baseline image and file object change records are related. This is the data required to allow a self-consistent Disk Recovery at the point-in-time which the Integrity Point represents. Thus, the full disk copy and the file changes, creations, deletions, or relocations that occurred during the full disk copy are collected into a set to represent a fully restorable point called the "Integrity Point".

Change Tracking

Figure 3:
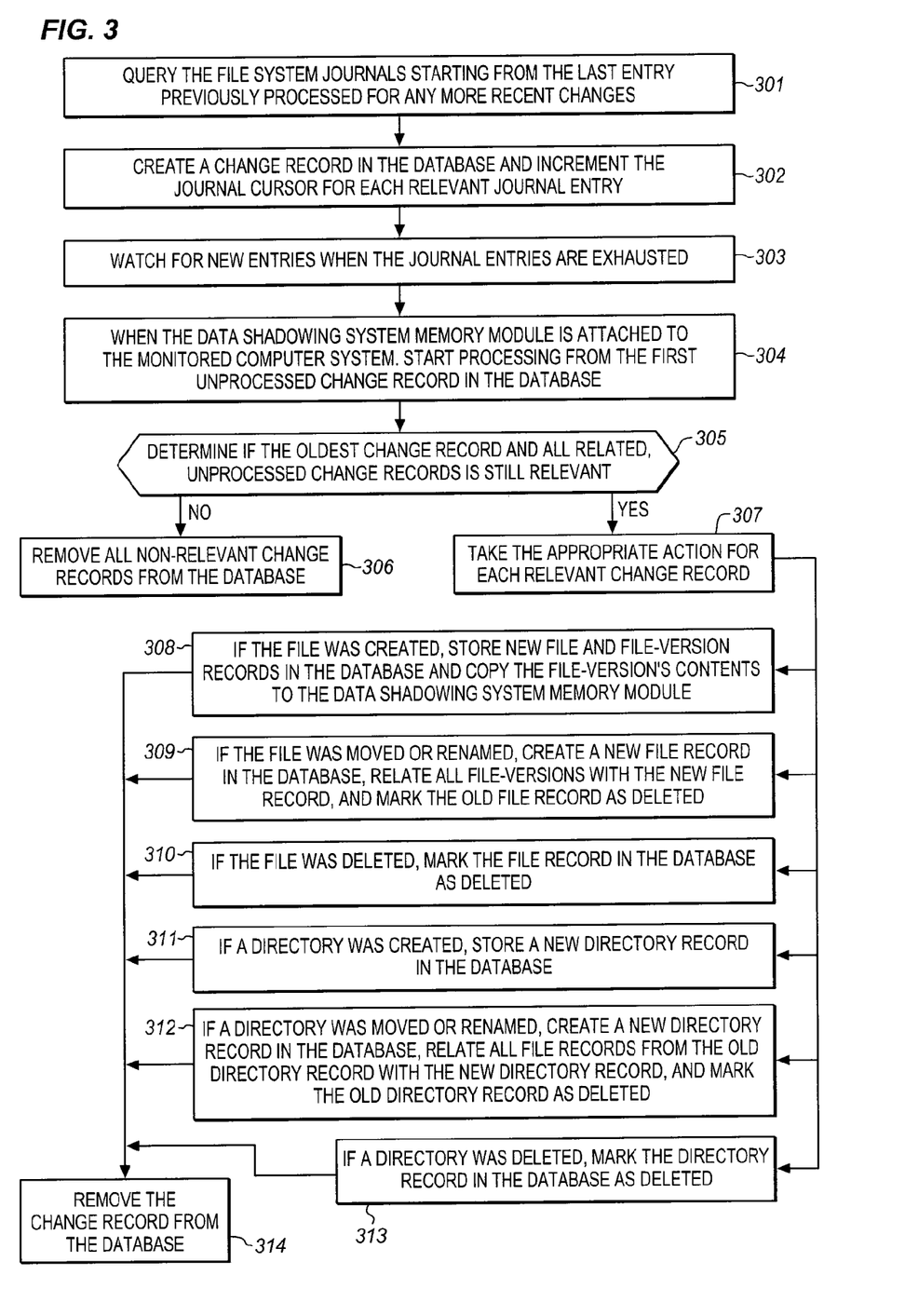
FIG. 3 illustrates, in flowchart form, the operation of the present Data Shadowing System to store a copy of the data that is presently added to the monitored computer system's memory.

FIG. 3 illustrates, in flowchart form, the operation of the present Data Shadowing System 100 to store a copy of data that are newly added to the monitored computer system's memory 113. The Data Shadowing System 100 process registers with the operating system change journal in order to receive notification of changes occurring to files and folders residing on the monitored computer system memory 113. The change journal then dynamically notifies the Data Shadowing System 100 of changes, permitting the Data Shadowing System 100 to determine the appropriate action to take. File creation, movement, content changes, and renaming are all events requiring action, and each action is entered into an action queue for processing.

The Data Shadowing System action queue is utilized for periods where the Data Shadowing System memory module 101 is attached or detached from the monitored computer system 110. If the memory module 101 is attached to the monitored computer system 110, the Data Shadowing System 100 processes each action queue entry, updating the entry in the database 114 and, if necessary, compressing and transferring the file binary contents to the Data Shadowing System memory module 101.

During periods of time that the Data Shadowing System memory module 101 is detached, the action queue is utilized for recording actions that are to be performed once the memory module 101 is attached to the monitored computer system 110. This recording process permits the Data Shadowing System 100 to prioritize the actions to be performed, selecting the files of highest importance to be processed before lower priority files. This is the continuous process of maintaining the data required to assemble a consistent-in-time view of the file systems. The process of change tracking begins immediately after the Initialization and Indexing is complete, as described above.

Journal Processing

Journal processing is continuous and occurs whether or not the Data Shadowing System memory module 101 is attached to the monitored computer system 110. The control software component 103 of the Data Shadowing System 100 at step 301 queries the file system journals for any more recent changes, starting from the last entry previously processed. The control software component 103 at step 302 then creates a change record in the action queue in database 114 and increments the journal cursor for each relevant journal entry. For each relevant journal entry, the control software component 103 creates a change record in the action queue in database 114 and increments the journal cursor. When the journal entries are exhausted (up-to-date), the control software component 103 watches for new entries.

Data Synchronization

Data Synchronization is intermittent and occurs only when the Data Shadowing System memory module 101 is attached to the monitored computer system 110. When the memory module 101 is attached to the monitored computer system 110, the control software component 103 starts processing at step 304 from the first unprocessed change record in the action queue in database 114. For the oldest change record, and all related, unprocessed change records, the control software component 103 at step 305 determines if each is still relevant (for example, if the file was created and is already deleted, it is not relevant). The control software component 103 at step 306 removes all non-relevant change records from the action queue in database 114. Alternatively, at step 307, the control software component 103 takes the appropriate action for each relevant change record. If the file was created, the control software component 103 stores new file and file-version records in the action queue in database 114 and copies the file-version's contents to the Data Shadowing System memory module 101 at step 308. If the file was moved or renamed, the control software component 103 creates a new file record in the action queue in database 114, relates all file-versions from the old file record with the new file record, and marks the old file record as deleted at step 309. If the file was deleted, the control software component 103 marks the file record in the action queue in database 114 as deleted at step 310. If a directory was created, the control software component 103 stores a new directory record in the action queue in database 114. If a directory was moved or renamed, the control software component 103 creates a new directory record in the action queue in database 114, relates all file records from the old directory record with the new directory record, and marks the old directory record as deleted at step 312. If a directory was deleted, the control software component 103 marks the directory record in the action queue in database 114 as deleted at step 313. Finally, at step 314, the control software component 103 removes the change record from the action queue in database 114 and processing returns to step 305.

Create an Integrity Point

Figure 4:
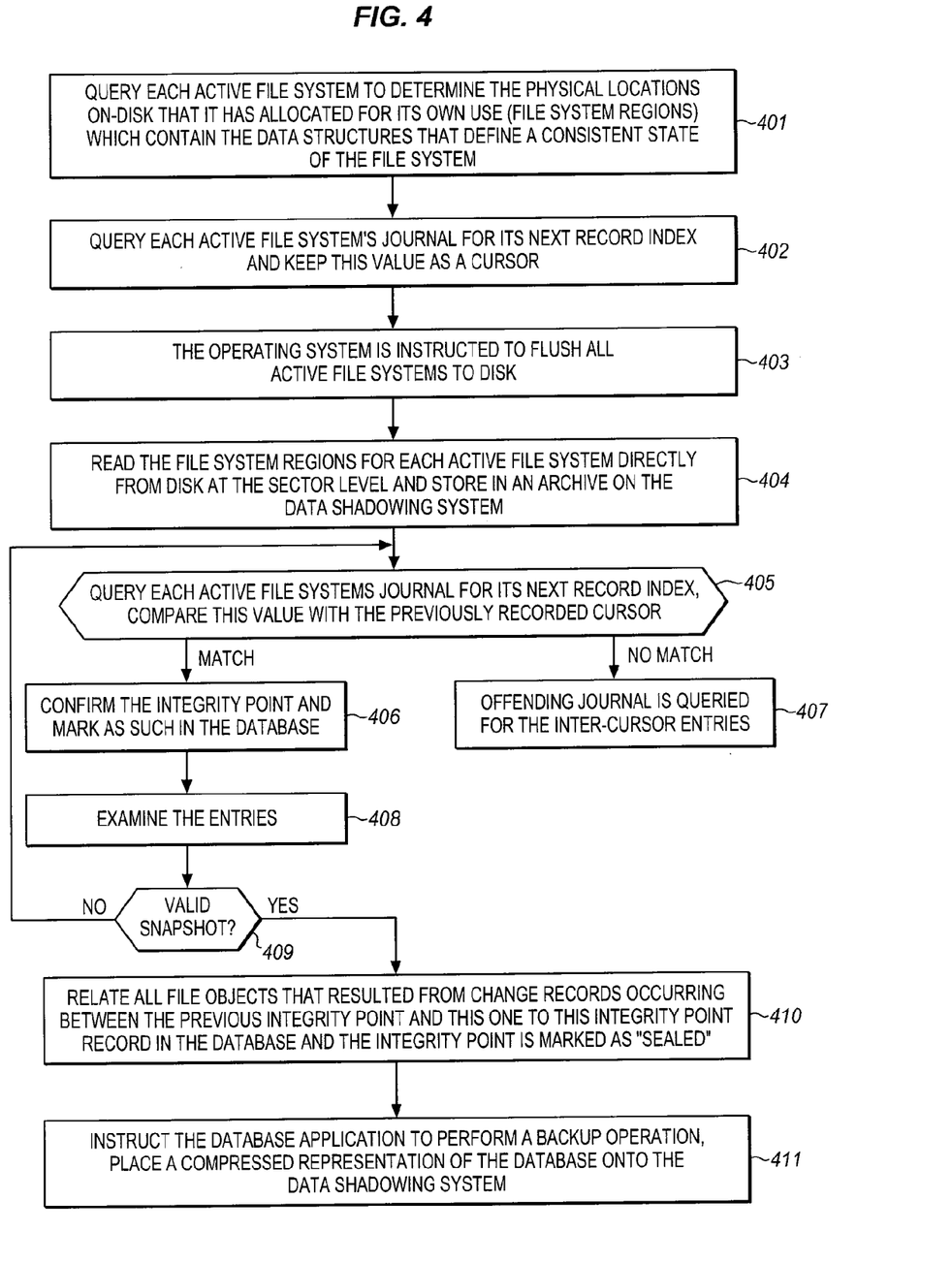
FIG. 4 illustrates, in flowchart form, the operation of the present Data Shadowing System to create and store an integrity point to benchmark changes in the monitored computer system's memory.

FIG. 4 illustrates, in flowchart form, the operation of the present Data Shadowing System 100 to create and store an Integrity Point to benchmark changes in the monitored computer system's memory 113.

This is the operation required to store the information necessary to execute a Disk Recovery for a point-in-time. The process of creating an Integrity Point requires reading and storing a self-consistent "snapshot" of the metadata files maintained on-disk by the active file systems. This requires monitoring these file systems for changes occurring while the snapshot is created and deciding if they invalidate the snapshot, requiring another attempt. Exemplary operations include the following steps.

Before attempting to create an Integrity Point, Journal Processing and Data Synchronization must be up-to-date. Each active file system is queried (or directly parsed) by the control software component 103 at step 401 to determine the physical locations on-disk that is has allocated for its own use (File System Regions). These File System Regions contain the data structures that define a consistent state of the file system and must be self-consistent. The control software component 103 then queries each active file system's journal at step 402 for its next record index, and this value is kept as a cursor. The control software component 103 instructs the operating system to flush all active file systems to memory 102 at step 403, and the File System Regions for each active file system are read directly from disk 113 at the sector level and stored in an archive on the Data Shadowing System 100 at step 404.

The control software component 103 again queries each active file system's journal at step 405 for its next record index, and this value is compared with the previously recorded cursor. If the cursors match, then at step 406, the Integrity Point is "confirmed" and marked as such in the database 114. If the cursors do not match, the offending journal is queried for the inter-cursor entries at step 407. The entries are examined by the control software component 103 at step 408, and a decision is made whether or not they invalidate the snapshot. If so, the process is repeated from step 401 until a valid snapshot is achieved. If the snapshot is valid, then at step 410, all file objects that resulted from change records occurring between the previous Integrity Point and this one are related to this Integrity Point record in the database 114 and the Integrity Point is marked as "sealed." The database application is instructed at step 411 to perform a backup operation, resulting in the placement of a compressed representation of the database 114 onto the memory module 101 of the Data Shadowing System 100.

File Version Retrieval

Figure 5A:
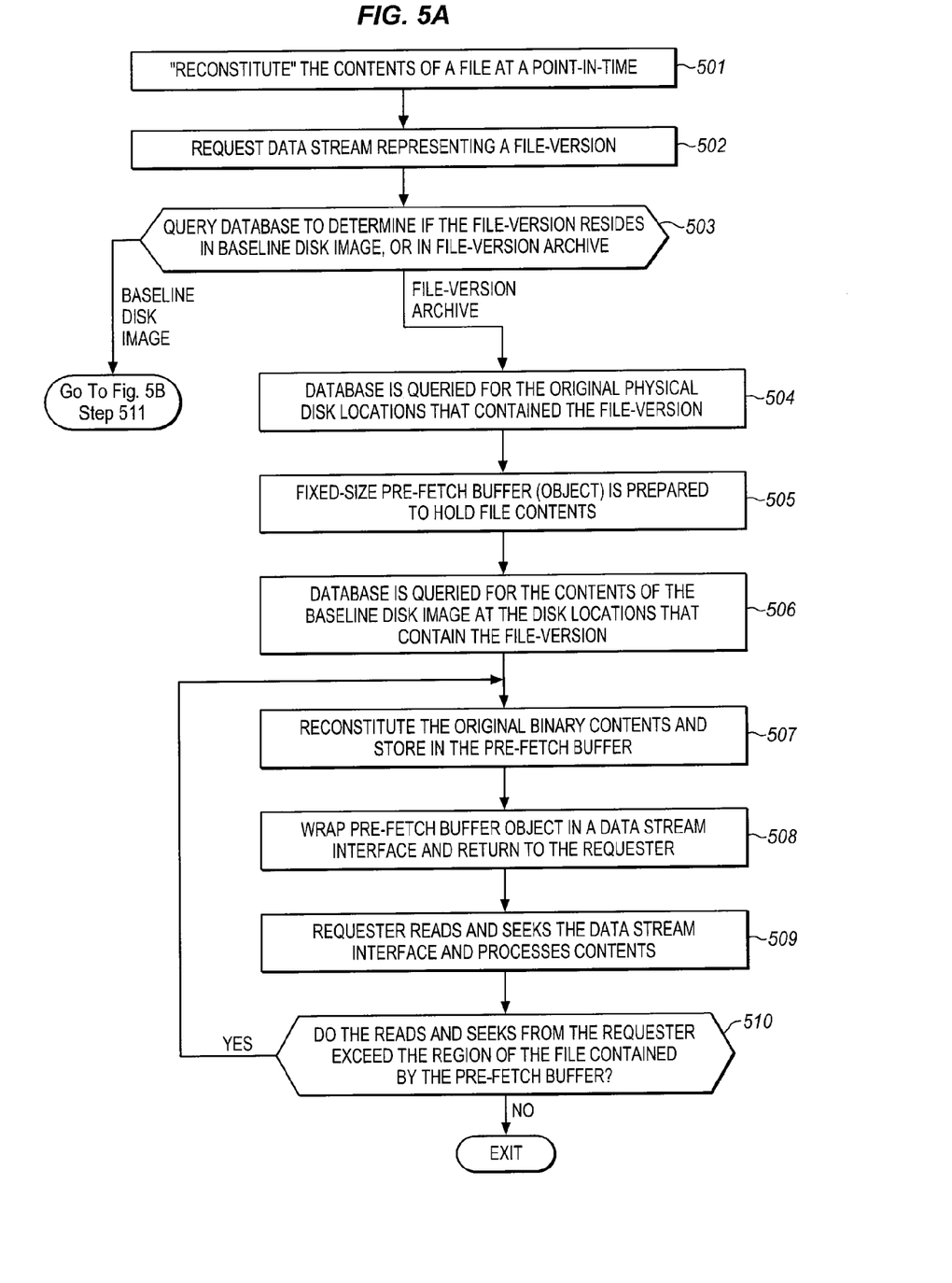
FIG. 5 illustrates, in flow diagram form, the operation of the present Data Shadowing System to retrieve data stored therein for restoration of a file in the memory of the monitored computer system.
Figure 5B:
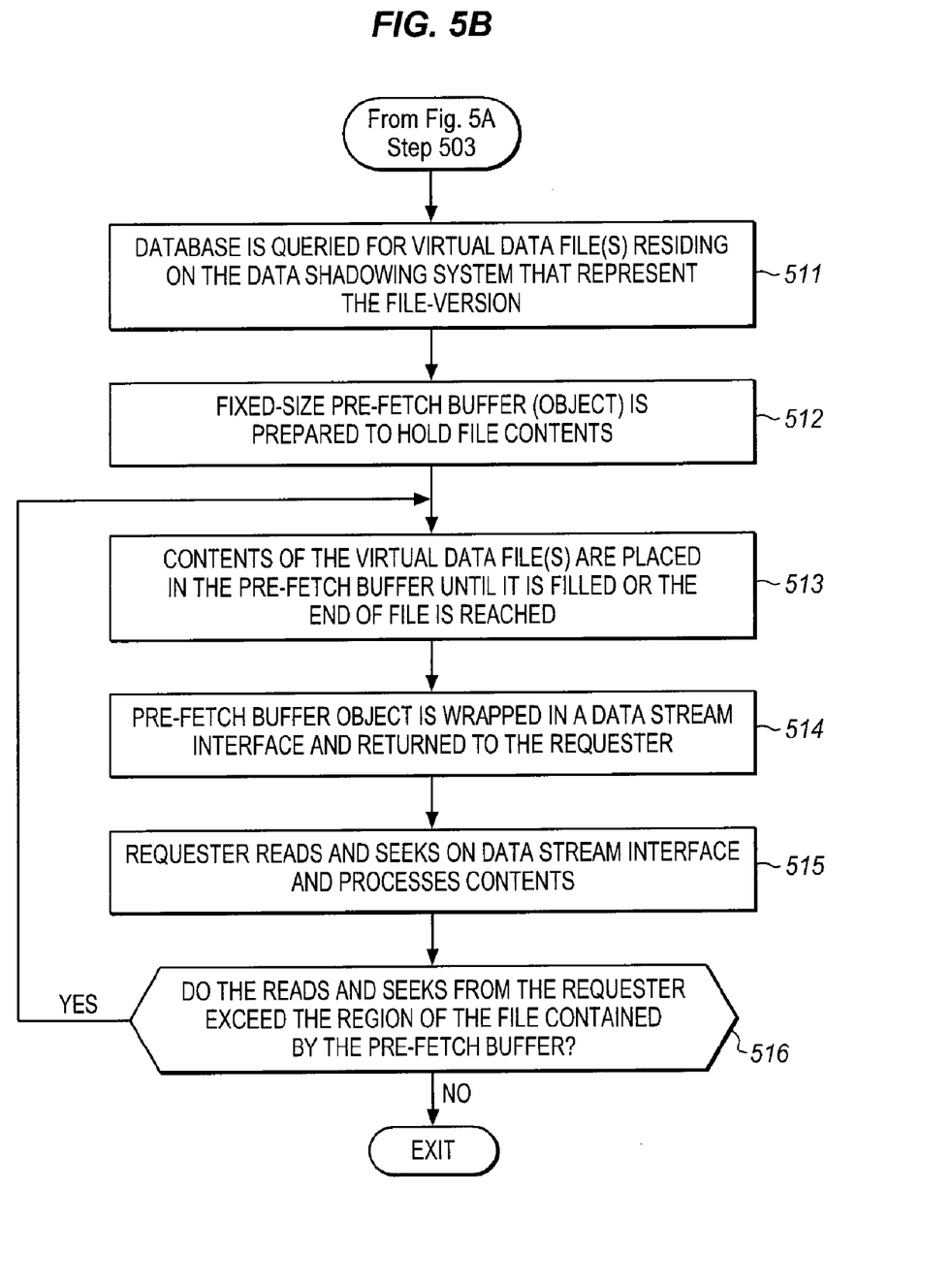

FIG. 5 illustrates, in flow diagram form, the operation of the present Data Shadowing System 100 to retrieve data stored therein for restoration of a file in the memory 113 of the monitored computer system 110. This is the operation to "reconstitute" the contents of a file at a point-in-time. This file-version may reside in the baseline disk image stored to the Data Shadowing System 100 during initialization or in a file-version archive on the Data Shadowing System 100.

The database 114 contains records of each file that has been stored on the Data Shadowing System 100, including the files captured during initialization. Over the course of time, data which enables the restoration of multiple versions of a given file may be stored on the Data Shadowing System 100, creating the ability to retrieve a version of a file from one of several points-in-time. When a file is modified on the monitored computer system 110, the new data is hashed, named, and stored on the monitored computer system 110; and the old version of the file is removed and replaced with only a description of its binary differences to the new version (Reverse X-Delta). This strategy allows for Data Shadowing System 100 to keep pristine copies of all current files, while being able to regenerate previous versions at all times and minimizing data storage space requirements on the Data Shadowing System 100 itself.

The process of retrieving a file from the database and related location of the Data Shadowing System 100 begins at step 501 where the user opens a user interface and navigates through the hierarchical file and folder system to locate the desired file or folder. The user selects the desired file or folder at step 502 and uses "drag and drop" functionality to move the selected file or folder to another folder location (e.g., 'Desktop' or 'My Documents') on the monitored computer system. Upon releasing the mouse button, the operating system at step 503 generates a request from the Data Shadowing System 100 for data related to the source file identified by the user interface. The database then is queried at step 504 to locate the present version of the selected file and its binary differences to the new version, traced back to the point-in-time selected by the user.

If the user selects a present version of the file, at step 505, the Data Shadowing System 100 retrieves the pristine copy of the current file and delivers the file to the user. Otherwise, the Data Shadowing System 100, at step 506, uses the collection of binary differences to trace the selected file backwards in time to recreate the selected version of the file as indicated by the user, and then delivers the reconstructed file to the user. The user reads and seeks on the data stream interface at step 507 and processes the contents as desired.

Disk Recovery

Figure 6:
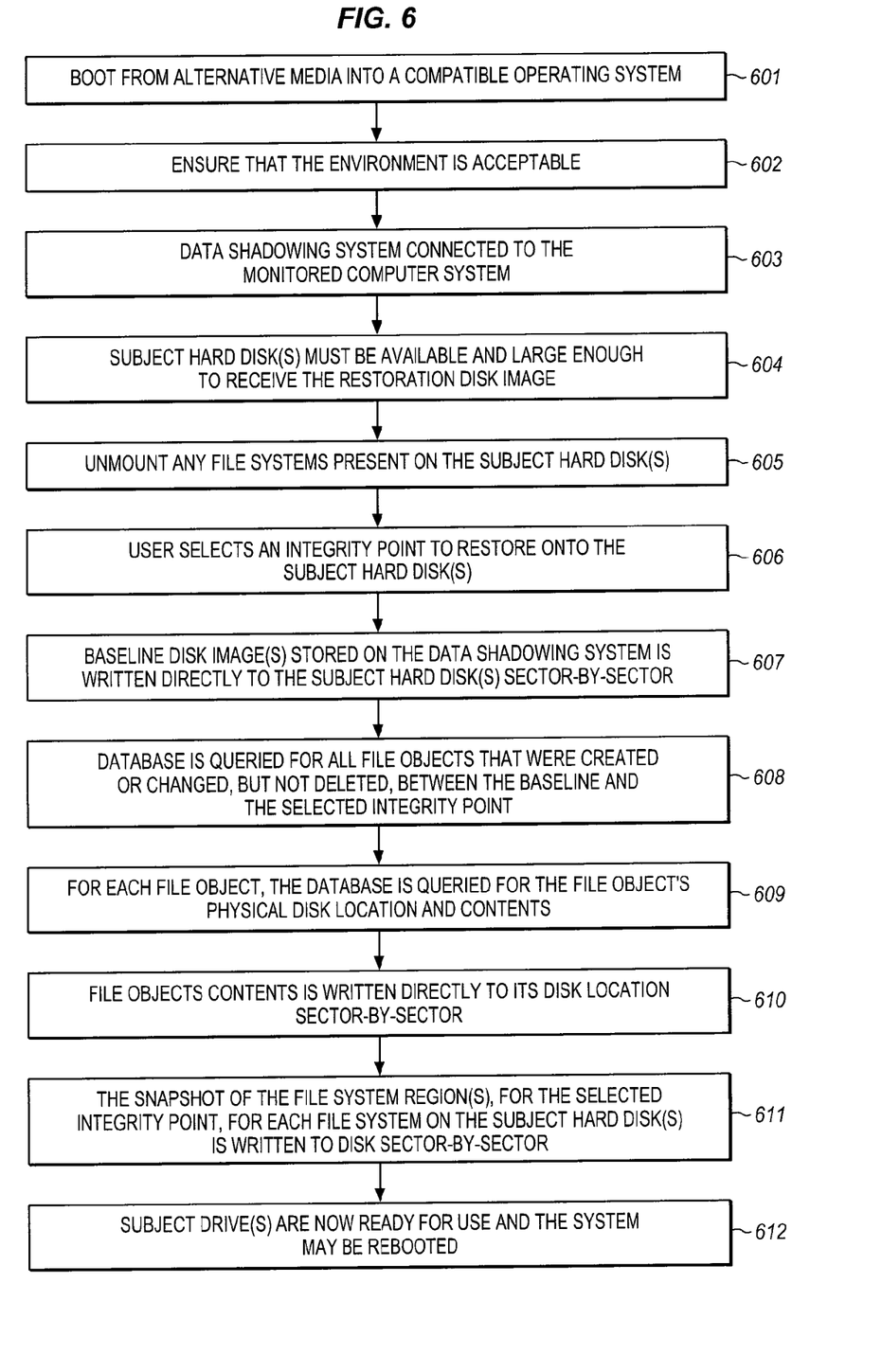
FIG. 6 illustrates, in flow diagram form, the operation of the present Data Shadowing System to retrieve data stored therein for restoration of the entirety of the memory of the monitored computer system.

FIG. 6 illustrates, in flow diagram form, the operation of the present Data Shadowing System 100 to retrieve data stored therein for restoration of the entirety of the memory 113 of the monitored computer system 110. This is the operation required to restore the complete state of a physical disk 113 of the monitored computer system 110 at a point-in-time. The available points-in-time are defined by previously stored Integrity Points. The goal of a Disk Recovery is to "reconstitute" a self-consistent image of the subject physical disk 113 to the sector level and write this to a hard disk 113 on the monitored computer system 110.

In order to write to the physical system disk 113, it is necessary to boot the monitored computer system 110 from an alternative media and ensure that the file systems on that disk 113 are not in use at step 601. At step 602, the user must ensure that the environment is acceptable. The Data Shadowing System 100 is connected to the monitored computer system 110 at step 603 and must be accessible. At step 604, the subject hard disk(s) 113 must be available and large enough to receive the restoration disk image. The subject hard disk 113 does not need to be formatted, but can be formatted if desired. At step 605, any file systems present on the subject hard disk(s) are unmounted and the user selects an Integrity Point to restore onto the subject hard disk(s) 113 at step 606.

The baseline non-NTFS disk image(s) stored on the Data Shadowing System 100 is written directly to the subject hard disk(s) 113 sector-by-sector at step 607. The database 114 is queried at step 608 for the snapshot corresponding to the closest file system image to the selected baseline. At step 609, the snapshot is written to the subject hard disk(s) and, for each file object, the database 114 is queried at step 610 for the file object's storage location. The file object's contents are written directly to its disk location at step 611. The subject drive(s) 113 are now ready for use, and the monitored computer system 110 may be rebooted at step 612.

Guest PC/Portable File Access

The Data Shadowing System 100 makes note of distinguishing features of the monitored computer system 110 such that the connection of the Data Shadowing System memory module 101 to a second, non-host computer system is quickly identified. In this alternative connection condition, the Data Shadowing System "Autorun" initialization application asks the user if they want access to the files stored within the Data Shadowing System memory module 101 or if they wish to re-initialize the Data Shadowing System 100 to pair with the newly connected computer system. If the user wishes to re-initialize with the newly connected computer system, all backup data from the previous monitored computer system 110 is eliminated, and a message indicating the same is displayed. If the user wishes to access files contained on the memory module 101, the Data Shadowing System 100 initializes a limited application permitting the user to utilize the same graphical user interface as before. The user may then locate and drag-and-drop files onto the newly connected computer system hard disk drive.

The operating system on the monitored computer system recognizes specific files contained in the base directory of a disk drive or Data Shadowing System 100 newly connected to the monitored computer system 110. The file of type 'autorun.inf' alerts the operating system to the presence of a sequence of operations to be performed, as defined within the file. The Data Shadowing System 100, upon successful installation onto the monitored computer system 110, alters this 'autorun.inf' file to behave differently if plugged into a subsequent, or guest, computer system. This altered 'autorun.inf' file instructs the Data Shadowing System 100 to make available the contents of the drive by reconstructing and interrogating the duplicated database. Through this method, user files of interest may be identified for copying onto the guest computer system. Therefore, the monitored computer system's files, such as digital photographs and music files, may be transferred from the Data Shadowing System 100 onto the guest computer system for display or sharing as desired.

In order to make the access to files on the guest computer system as seamless as the access on the monitored computer system, the file explorer system of the guest computer system is utilized. By registering with, and making calls to, the file explorer system, the display of the contents of the Data Shadowing System 100 mimics the display of the contents of the user's typical computer system.

Summary

The Data Shadowing System automatically stores the data on the memory module in a single format, while representing it in a data management database in two formats: disk sectors and files. The Data Shadowing System thereby efficiently tracks and stores the state of multiple file systems over time, while allowing for correct disk-level and file-level restoration to a point-in-time without storing redundant data.

What is claimed as new and desired to be protected by Letters Patent of the United States is:

1. A data shadowing system, connectable to a monitored computer system, for the automatic backup storage into the data shadowing system of data that is written in the memory of the monitored computer system and the selective retrieval of this data from the data shadowing system for restoration to said memory of said monitored computer system, said data shadowing system comprising:
   data shadow copy module, external to and in communication with a monitored computer system, for storing a shadow copy of the data which is written in the memory of the monitored computer system; and
   customer data file manager, resident in said monitored computer system, for autonomously transmitting customer data files, which comprise non-NTFS files resident on said monitored computer system, to said data shadow copy module, comprising:
      customer data file map generator for autonomously mapping file directory structures associated with each of the customer data files into file tree information which identifies original names and a location of each customer data file that is stored in the memory of the monitored computer system, as well as a corresponding location in said data shadow copy module which stores a copy of these customer data files to enable both memory-level and file-level restoration of data, and
      mapping database for storing said file tree information in a database in said monitored computer system.

2. The data shadowing system of claim 1 wherein said customer data file manager further comprises:
   customer data file hash generator for processing each of said customer data files to generate an associated hash value of each said customer data file to uniquely identify said customer data file;
   wherein said data shadow copy module comprises:
      customer data file storage for storing each of said customer data files and said associated customer data file uniquely identity hash value in said data shadow copy module; and
   wherein said mapping database stores said hash value of each of said customer data files in said database.

3. The data shadowing system of claim 2 wherein said customer data file storage additionally stores said file tree information with each of said customer data files and said associated hash value in said data shadow copy module.

4. The data shadowing system of claim 2, further comprising:
   system file manager, resident in each of said plurality of monitored computer systems, for autonomously storing system files on said data shadow copy module, comprising:
      system file map generator for autonomously mapping file directory structures associated with system files written in the memory of the monitored computer system into system file tree information which identifies original names of system files as stored on said monitored computer system, a location of the data files in the memory of the monitored computer system, and a location in said data shadow copy module which stores said system files,
      wherein said mapping database stores said system file tree information in a database in said monitored computer system.

5. The data shadowing system of claim 4 wherein said system files comprise:
   computer files, exclusive of customer provided data, including at least one of: master boot record, partition table, and programs.

6. The data shadowing system of claim 4 wherein said system file manager further comprises:
   system file hash generator for processing each of said system files to generate an associated hash value of each said system file to uniquely identify said system file;
   wherein said data shadow copy module further comprises:
      system file storage for storing each of said system files and said associated system file uniquely identity hash value in said data shadow copy module; and
   wherein said mapping database stores said hash value of each of said customer data files in said database.

7. The data shadowing system of claim 6 wherein said system file storage additionally stores said system file tree information with each of said system files and said associated hash value in said data shadow copy module.

8. The data shadowing system of claim 2 wherein said customer data file manager further comprises:
   change journal for automatically tracking changes to said customer data files, including: customer data file creation, customer data file movement, customer data file content changes, and customer data file renaming.

9. The data shadowing system of claim 8 wherein said customer data file manager further comprises:
- file history, responsive to a modification of a customer data file, for generating file change data indicative of a difference between said customer data file and said modified customer data file; and
- wherein said customer data file storage stores said file change data in said data shadow copy module and substitutes said modified customer data file for said customer data file in said data shadow copy module.

10. The data shadowing system of claim 2 wherein said customer data file manager further comprises:
- data compressor for compressing said customer data file prior to storage in said data shadow copy module.

11. The data shadowing system of claim 1 wherein said customer data file manager further comprises:
- metadata index generator for uniquely identifying the active customer data file systems to extract relevant metadata for every file object in the file system; and
- metadata index database for recording said metadata in a database.

12. The data shadowing system of claim 1 wherein said customer data file manager further comprises:
- file system snapshot for uniquely identifying all active customer data files at a selected point in time; and
- snapshot storage for storing said uniquely identifying in memory as an Integrity Point representative of a present content of all said customer data files.

13. A method for the automatic backup storage into a data shadowing system which is connectable to a monitored computer system, of data that is written in the memory of a monitored computer system and the selective retrieval of this data from the data shadowing system for restoration to said memory of said monitored computer system, comprising:
- storing, in a data shadow copy module which is external to and in communication with a monitored computer system, a shadow copy of the data which is written in the memory of the monitored computer system; and
- autonomously transmitting customer data files, which comprise non-NTFS files resident on said monitored computer system, to said data shadow copy module, comprising:
  - autonomously mapping file directory structures associated with each of the customer data files into file tree information which identifies original names and a location of each customer data file that is stored in the memory of the monitored computer system, as well as a corresponding location in said data shadow copy module which stores a copy of these customer data files to enable both memory-level and file-level restoration of data, and
  - storing said file tree information in a database in said monitored computer system.

14. The method for the automatic backup storage of data of claim 13 wherein said step of autonomously storing customer data files further comprises:
- processing each of said customer data files to generate an associated hash value of each said customer data file to uniquely identify said customer data file;
- wherein said step of storing a shadow copy of the data comprises:
  - storing each of said customer data files and said associated hash value in said data shadow copy module; and
- wherein said mapping data database stores said hash value of each of said customer data files in said database.

15. The method for the automatic backup storage of data of claim 14 wherein said step of storing each of said customer data file additionally stores said file tree information with each of said customer data files and said associated hash value in said memory module.

16. The method for the automatic backup storage of data of claim 14, further comprising:
- autonomously storing system files on said data shadow copy module, comprising:
  - autonomously mapping system files written in the memory of the monitored computer system into system file tree information which identifies original names of system files as stored on said monitored computer system, a location of the data files in the memory of the monitored computer system, and a location in said data shadow copy module which stores said system files, and
  - storing said system file tree information in a database in said monitored computer system.

17. The method for the automatic backup storage of data of claim 16 wherein said system files comprise:
- computer files, exclusive of customer provided data, including at least one of: master boot record, partition table, and programs.

18. The method for the automatic backup storage of data of claim 16 wherein said step of autonomously storing system files further comprises:
- processing each of said system files to generate an associated hash value of each said system file to uniquely identify said system file;
- wherein said step of storing a shadow copy of the data comprises:
  - storing each of said system files and said associated hash value in said data shadow copy module; and
- wherein said mapping data database stores said hash value of each of said customer data files in said database.

19. The method for the automatic backup storage of data of claim 18 wherein said step of storing each of said system files additionally stores said system file tree information with each of said system files and said associated hash value in said data shadow copy module.

20. The method for the automatic backup storage of data of claim 14 wherein said step of autonomously storing customer data files further comprises:
- autonomously tracking changes to said customer data files, including: customer data file creation, customer data file movement, customer data file content changes, and customer data file renaming.

21. The method for the automatic backup storage of data of claim 20 wherein said step of autonomously storing customer data files further comprises:
- generating, in response to a modification of a customer data file, file change data indicative of a difference between said customer data file and said modified customer data file;
- wherein said step of storing a shadow copy of the data stores said file change data in said data shadow copy module and substitutes said modified customer data file for said customer data file in said data shadow copy module.

22. The method for the automatic backup storage of data of claim 14 wherein said step of autonomously storing customer data files further comprises:
- compressing said customer data file prior to storage in said data shadow copy module.

23. The method for the automatic backup storage of data of claim 13 wherein said step of autonomously storing customer data files further comprises:

uniquely identifying the active customer data file systems to extract relevant metadata for every file object in the file system; and recording said metadata in a database.

24. The method for the automatic backup storage of data of claim 13 wherein said step of autonomously storing customer data files further comprises:

uniquely identifying all active customer data files at a selected point-in-time; and storing said uniquely identifying in memory as an Integrity Point representative of a present content of all said customer data files.

\* \* \* \* \*